J. Lewis.
Berel Gear.
No. 1,025. Patented Nov. 29. 1838.
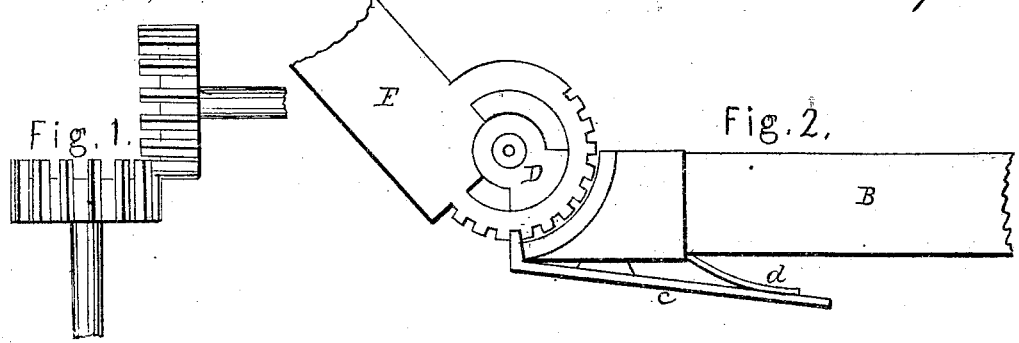
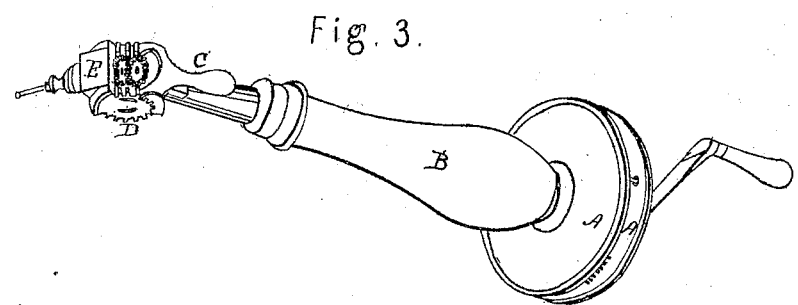
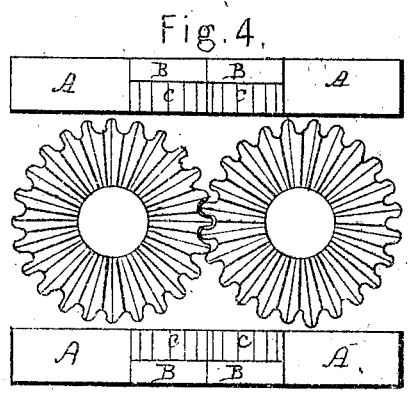
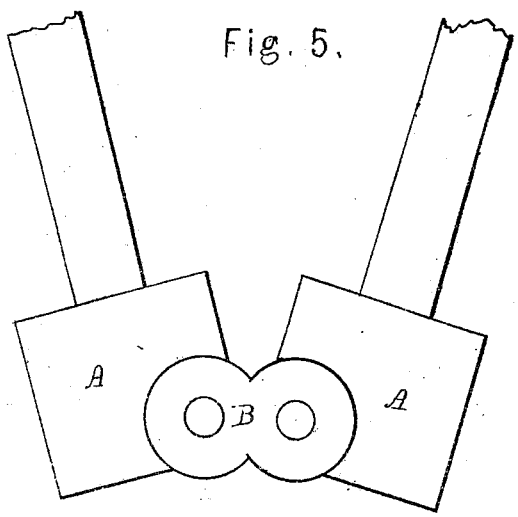
Witnesses:
Inventor:
John Lewis

UNITED STATES PATENT OFFICE.

JOHN LEWIS, OF BURLINGTON, VERMONT.

UNIVERSAL BEVEL-GEAR SUITED TO ALL POSSIBLE DIRECTIONS FROM A STRAIGHT LINE TO ONE HUNDRED AND EIGHTY DEGREES.

Specification forming part of Letters Patent No. 1,025, dated November 29, 1838.

*To all whom it may concern:*

Be it known that I, JOHN LEWIS, of Burlington, in the county of Chittenden and State of Vermont, have invented a new and Improved Method of Making a Bevel-Gear, called the "Universal Bevel-Gear," which is so arranged as to be capable of varying the direction of the shafts to any required angle. This is done in the following manner, which I shall describe by a "dental drill."

Figure 1 exhibits a view of the gearing which connects the shafts in their rotary motion. When the shafts are in one straight line, the cogs become all interlocked and form a complete coupler, and as the shafts vary from a straight line they operate as a bevel-gear until they arrive at a right angle, when they operate on the principle of a crown-gear, and continuing the variation in the relative direction of the shafts the gear again operates as a bevel-gear until the shafts become parallel, when the gearing assumes the principle of a spur-gear. Where the same letters occur in Figs. 1, 2, and 3 they refer to the same parts.

Fig. 2 exhibits a side view of the joint and of the gearing by which the relative direction of the shafts is kept stationary and moved at pleasure. D is connected with the part B, and the cog-wheel is connected with the part E, and they are held in their relative position by the pawl C, which is kept in its place by the spring *d*. It will be seen that the pawl C can be raised out of the cog-wheel so as to vary the direction at pleasure, and by letting the pawl fall again between the cogs will retain the shafts in any relative angle that may be required.

Fig. 3 is a perspective view of the said dental drill, which exhibits the whole machinery above described. Between the circles A A, Fig. 3, is a spur-wheel on the pivot of the crank, which gears into three pinions in equilateral position, and on the pivot of each of said pinions is a spur-wheel, each of which gears into a pinion on the shaft, which extends through the handle B and gives motion to the drill. A variation in the form, which in principle is the same, is by forming two spur-wheels the cogs or spurs of which are rounded at the corners, which revolve toward each other as the shafts are varied in their relative position, and which cogs project forward on the face of the wheel, so that when the two shafts form one straight line the cogs all interlock and form a complete coupler, and by the aid of connecting-links they continue in gear in all relative positions or angles of the shafts until they become parallel. An end view of the gearing may be seen at Fig. 4, where the ends of the two shafts appear in the center of the two wheels.

The letters on Figs. 4 and 5 refer to the same parts. A A, which contain the wheels, and through which the shafts pass, are connected together by the connecting-links B, and in the adjacent corners of A A, inside of the links, cogs or spurs C C are made, which interlock with each other and keep A A, and consequently the shafts, in a proper relative position in all their movements. The proportion and size of the wheels which gear into each other will always be governed by the length of the connecting-links. The advantage of this kind of gearing is its perfect connection and ease of motion through all the relative positions of the two shafts from a straight line to a parallel position.

In making my claim I am aware that gearing has been used in great variety of form and combination, but I am not aware that what I denominate the "universal bevel-gear," as hereinbefore described, has ever before been known or used.

I therefore claim as my invention—

The universal bevel-gear as the same is hereinbefore described.

JOHN LEWIS.

Witnesses:
JNO. B. JOHNSON,
JOHN JOHNSON.